Aug. 17, 1926.
H. KAHN
1,596,046
MOVING PICTURE FILM AND THE LIKE
Filed March 19, 1923    2 Sheets-Sheet 1
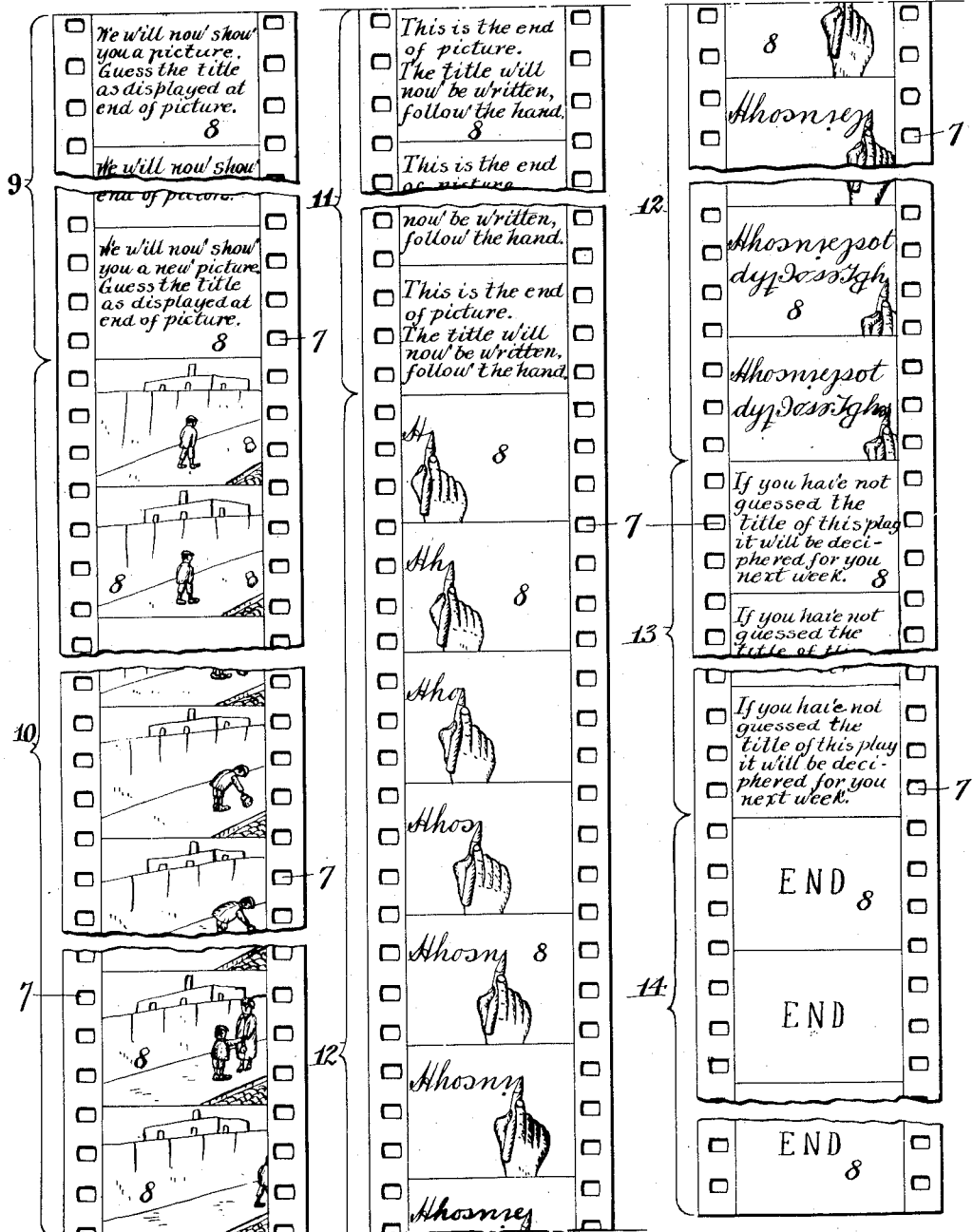

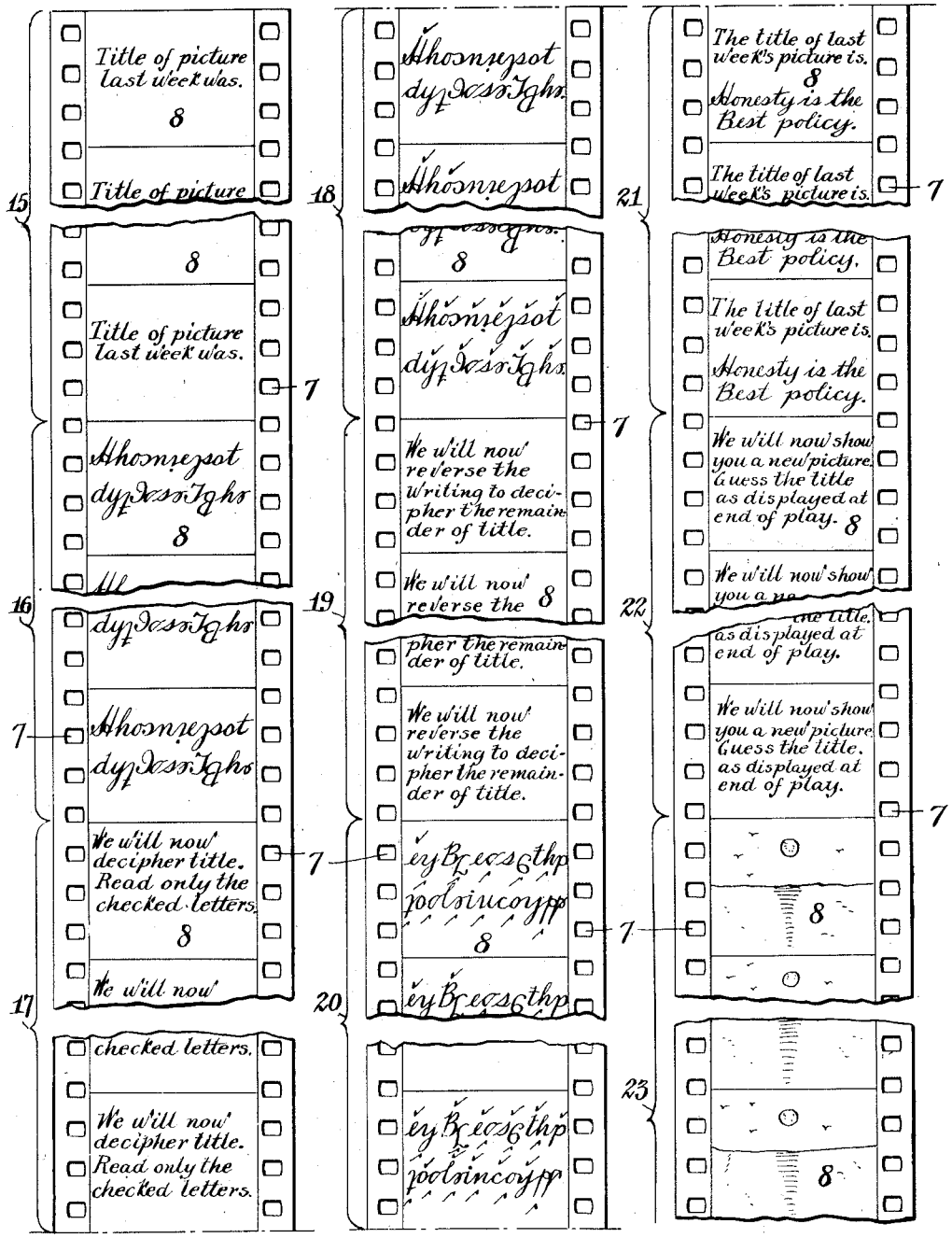

Patented Aug. 17, 1926.

1,596,046

UNITED STATES PATENT OFFICE.

HARRY KAHN, OF CINCINNATI, OHIO.

MOVING-PICTURE FILM AND THE LIKE.

Application filed March 19, 1923. Serial No. 625,980.

My invention relates to improvements in moving picture films and the like.

One of the objects of my invention is the provision of a film by means of which a play, story, current event, or other subject matter is pictorially displayed without the usual title at the beginning of the film, and in which the title is displayed in enigmatical form, preferably with its letters transposed, at the end thereof; the title in its preferable form consisting of non-syllabic letters which preferably are written partly upright in readable form and partly inverted, forming a sort of acrostic.

A further object of my invention is to provide a film of two parts, the first part comprising a number of sections arranged and bearing the matter above stated, and the second part having at the beginning thereof the title in illegible or transposed form and like that at the end of the first part, said second part having a number of sections following those bearing the title in transposed form, illustrating the manner in which the title in transposed form is to be read, and then displaying the title in readable form by re-arranging the letters to form a legible title, after which will follow a new untitled play, story, current event or other subject matter in pictorial form, having the title at the end thereof in transposed form.

A still further object of my invention is to provide a moving picture film comprising two parts to be displayed at intervals, the first part having pictorial sections followed by a title section or sections on which the title is displayed or is being displayed in enigmatical form, and the second part having pictorial sections preceded by sections bearing the enigmatical title of the first part, with sections between said last-mentioned sections and the pictorial sections displaying the manner of deciphering the enigmatical title and displaying the title in readable form after having displayed the manner of deciphering said title.

A further object of my invention is to display a name, word, or sentence having letters transposed and illustrating the manner of deciphering the transposed letters to illustrate the name, word, or sentence in legible manner, or in other words, to illustrate the manner of reading the transposed letters of the name, word, or sentence illustrated.

A still further object is the employment of a new and novel method of displaying enigmatical matter on a screen or the like.

The invention consists in displaying a name, word, or words in sentence form, with the letters thereof transposed, in illustrating the manner of reading the transposed letters to form such name, word, or sentence.

It also consists in illustrating letters of a name, word, or words forming a sentence in unrelated or unconnected and meaningless manner, in illustrating the manner of deciphering such name, word, or sentence, and in illustrating and correlating the letters as deciphered to form the selected name, word, or sentence.

It further consists in a motion picture film having pictorial sections followed by sections having the title in enigmatical form, preferably by transposing the letters of the title when in readable form.

It further consists in a motion picture film having pictorial sections followed by sections bearing the title of the pictorial sections in enigmatical form, said title sections being followed by sections illustrating the manner of reading the title in enigmatical form.

It further consists in a motion picture film having a series of pictorial sections followed by a second series of sections, each series of pictorial sections having displayed in connection therewith the title of the pictorial sections in enigmatical form, said first-mentioned series being followed by a series of sections illustrating the manner of deciphering its enigmatical title, and said deciphering series being followed by another series bearing the title in readable form, as deciphered.

It further consists in a motion picture film formed in two parts, one part having a series of pictorial sections followed by a series of sections bearing the transposed illegible title of the pictorial sections, the second part having a series of sections displaying said transposed title shown at the end of the first part, a series of sections immediately following and illustrating the manner of reading the transposed title, as displayed at the end of part 1 and at the beginning of part 2, a series of sections displaying the title in readable form as deciphered in the illustration of the preceding series of sections, a series of un-titled pictorial sections, and a series of sections bearing the title of the last-mentioned pictorial sections, with the letters of the title transposed.

It still further consists in means for displaying a name, word, or sentence in enigmatical form, by transposing the letters of the name, word, or sentence and inverting part of said letters, and in illustrating the manner of deciphering the transposed letters to read the name, word, or sentence illustrated in transposed form.

The invention still further consists in the novel features of construction and in the arrangement of letters, or part, or letters and parts, to be hereinafter described, and more particularly pointed out in the subjoined claims.

In the drawings:—

Figs. 1, 2 and 3 represent broken successive portions of one part of a two-part motion picture reel, and Figs. 4, 5 and 6 represent broken parts of successive portions of the second part of a moving picture reel arranged in accordance with my invention.

In the drawings I have illustrated a moving picture reel in what I now consider its preferred form, such reel being shown in two parts, each of which comprises a number of connected sections, portions of which are intended to display explanatory matter, a portion pictorial illustrations, and other portions a corrigendum or title of the pictorial illustrations in enigmatical form, and also a portion on one part displaying the title in proper or readable form, and a portion illustrating the manner of reading or deciphering the corrigendum or first title as written in enigmatical form.

In the examplification of my invention I include a series of film sections showing the corrigendum or enigmatical title above referred to, in the act of being written so that the matter on the film, as displayed, will illustrate the corrigendum or title in enigmatical form during the act of being written by a person, or at least illustrating the hand of the person writing the same.

I desire it to be understood that the pictorial portions of the two parts of the film need not necessarily be related and that one part of the film is intended to be displayed after the other with sufficient lapse of time between them to enable those seeing the title of the first part on the screen to decipher the title as displayed, with a view of verifying the same when the proper title is displayed during the time of projecting the second part of the reel onto the screen.

As is common in moving picture films, the film is provided along opposite marginal portions with regularly-spaced openings 7 adapted to receive parts of the film operating mechanism of a projecting machine to properly feed the film between the projecting light and the lens of the machine, and the film also is divided into sections 8 arranged in series along the length of the film. For example, part one of the film illustrated in Figs. 1, 2 and 3 has a series of sections 9 at the beginning of the film, on which may be displayed information to the effect that a picture will be shown, and that the audience is invited to guess the title of the picture as displayed at the end of this part of the film. The sections of this series may contain the following words,—"We will now show you a picture. Guess the title as displayed at the end of the picture", or words of like effect, and the sections of the series are sufficient in number so that while operating the reel, this information will be displayed on the film for a sufficient length of time to enable the audience to read the same.

The second series of part one of the film, designated by the numeral 10, comprises film sections on which are illustrated to be displayed upon the screen, pictures representing a play, story, current or historical event, or the like, which film sections are to be considered the suggestion to the title. In the drawing these pictures represent a boy finding a pocketbook and restoring it to its rightful owner.

The third series of sections of part one of the film, designated by the numeral 11, bears explanatory matter, for example, matter informing the audience that the pictorial portion of the film has ended and the title to the play or pictorial portion will now be written, a sufficient number of sections being used for this explanatory matter so that it will appear on the screen for a sufficient length of time to enable the audience to read the same.

The fourth series of sections of part one of the film, designated by the numeral 12 and shown partly on Fig. 2 and partly on Fig. 3, illustrates the manner in which the title will appear on the screen; that is to say, the title of the pictorial sections will appear on the screen as it is gradually written by an individual or by the hand of some person, and the title as written will be displayed with its letters transposed, preferably having some of the letters inverted, forming what I term herein, a corrigendum.

It may here be stated that the steps of progress between the film sections of the pictorial series 10 and those of the series 12 on which the title is to appear in the act of being written, are not true to form or progress as they will appear on the actual screen, but are merely illustrated to indicate the general application of the ideas involved in this invention. For example, the first film of series 12 has the letter H shown thereon, but it is quite clear that several sections may be necessary in order to display the complete formation of this letter. The second section of said series indicates progress in the display of the title, since it has the letter "H" and the letter y, inverted, displayed thereon. The third section of said series indicates further progress, it having the letters H, y inverted, and the letter o displayed thereon. The fourth section of said series shows the letters H, y inverted, o, and c inverted, displayed thereon; this being continued until the final section of the series 12 appears, whereon the completed title in transposed form is shown, said transposed title in finished form having the following letters displayed successively, viz: H, y inverted, o, c inverted, n, i inverted, e, l inverted, s, o inverted, t, p inverted, y, t inverted, I s inverted, s, e inverted, T, B inverted, h, and e.

It is of course to be understood that a sufficient number of sections are used in series 12 so that this transposed, apparently meaningless title or corrigendum, will appear as though written on a sheet of paper, and that when the title is completed, a sufficient number of films bearing the completed title will be used to display said completed title for a sufficient length of time to permit the audience to guess the title of the pictorial sections displayed or, if desired, the film may be stopped for a few minutes to give the audience sufficient time to guess the title.

After the series of sections 12, a series of sections 13 may be employed to inform the audience that if they have not guessed the title of the play, it will be deciphered for them on display of the next picture illustrated on part two of the film, shown in Figs. 4, 5 and 6, a sufficient number of film sections being used for this purpose to enable the audience to easily read the same.

At the end of part one of the film, a series of sections 14 may bear the word "End," indicating that the first part of the film has been displayed.

The explanatory matter contained on the sections of the series 9 may be dispensed with and the pictorial sections be displayed at the commencement of the film; also, if desired, the explanatory matter contained on the series of sections 11 and 13 may be dispensed with; also that on series 14, without in any manner detracting from the value of the features contained on the remaining series of sections. However, I consider sections 9, 11, 13 and 14 desirable to make clear to an audience, the purpose of displaying the pictorial sections without a title, and the purpose of displaying the title in transposed form; but it is quite apparent that this information may be imparted by word of mouth and the explanatory sections dispensed with in such cases.

It will be clear from the foregoing that part one of the film illustrated in Figs. 1, 2 and 3 are employed to display upon the screen, a picture without a title being displayed until the picture has been shown, and in then displaying the corrigendum or title in enigmatical form; for example, by transposing the letters of the actual time as it would appear in readable form, and preferably by having some of the transposed letters inverted to make it more difficult to decipher the same.

The title displayed on the last section or last few sections of the series 12 shown in the drawings, bears all the letters of the words "Honesty is the best policy", with the letters of such title arranged in unreadable form. It is intended to display a different film arranged according to this invention each week, and the film of the second or each succeeding week may be started with the series of sections 15, on which the words "Title of picture last week was" are displayed, or words to like effect.

The next series of part two of the film, designated by the numeral 16, will show the completed title with its letters transposed, or the corrigendum, as I term it, exactly as it appeared at the end of the series of section 12 in part one of the film, a sufficient number of sections being used to display this title for a length of time that will enable the audience to figure out, if possible, the actual title of the play displayed the previous week. After the corrigendum, or transposed or enigmatical title is displayed in this manner, information will be imparted to the audience that this title will now be deciphered, and for this purpose a series of sections 17 are employed on the film bearing the words,—"We will now decipher title. Read only the checked letters", or words to like effect. Following the explanatory film sections 17 is a series of sections 18 having the corrigendum or transposed title thereon in completed form, and this transposed title may be shown in connection with an individual in the act of deciphering the title for the audience, or it may be shown in connection with a hand checking the letters of the title, as explained with reference to the writing of the transposed title on the sections of series 13 of part one of the film, shown in Figs. 2 and 3.

I have illustrated the manner of checking the letters of the title so as to read the same, and for this purpose I employ a single section for checking the letters successively as they should appear in the actual title in readable form, but it is to be understood that it may be necessary in order to provide a continuity of action on the film, that a number of sections be employed for each letter. The space in the drawings does not, however, permit of displaying the film in such minute details.

The first section of the series 18 indicates that the first letter of line 1 of the corrigendum or transposed title is being checked, this letter being "H". The second film of this series shows the third letter "o" being checked, this being continued to the end of the series. When the first, third, fifth, seventh, ninth, eleventh, thirteenth, fifteenth, seventeeth, nineteenth and twenty-first letter of the transposed title appear as checked, the words "Honesty is" and a portion of the word "the" will have been spelled.

As a portion of the letters of this corrigendum or transposed title are displayed in inverted form, I preferably employ a series of sections 19 bearing information that the title will be reversed to enable the remainder of the same to be deciphered. On the sections of this series I have shown the sentence "We will now reverse the writing to decipher the remainder of the title". A sufficient number of sections will be employed for this explanatory manner to permit a display of the same for a sufficient length of time to enable the audience to easily read the information given.

Following the explanatory or informing series 19 is a series of sections 20, each of the series of sections having the corrigendum or transposed or enigmatical title thereon, but reversed from that shown in the series 18. Therefore, the first letter appearing on the first letter of the title (which was the second line as displayed in series 18) is e, and thus far the words "Honesty is the" have been checked, the audience following the checking to read the words as the letters thereof are being checked. The unchecked letters of the title as displayed in this series are then checked one after the other until the last section of the series is displayed, when it will be found that the letters checked in this series were e, b, e, s, t, p, o, l, i, c, y, completing the title "Honesty is the best policy."

After the series 20, a series of sections 21 may be employed, displaying the title of last week's picture as "Honesty is the best policy," and in displaying this matter, a sufficient number of sections are employed so that it will be displayed on the screen a sufficient length of time to enable the audience to easily read the same.

The second part of the film, or the film following the one displayed the previous week, is therefore a part of said last-mentioned film; at least up to the end of the series of sections 20, but, to complete my invention in all its details, a series of sections 22 immediately follows the series 21, informing the audience that a new picture will now be displayed, and for this purpose we have shown on these sections the words "We will now show a new picture. Guess the title as displayed at the end of play". Immediately following this series 22 of explanatory sections, a new picture or suggestion is displayed on the series of sections 23, shown broken away, as it is not believed necessary to illustrate the film to any further extent for the reason that after the series of sections 23, the title will appear on a series of sections with its letters transposed, as described with reference to the corrigendum or transposed title shown in Figs. 2 and 3 of part one of the film, the title being preferably written out in the same manner as the corrigendum or transposed title of part one of the film.

As a matter of explanation, it may be stated that the film to be shown the following week will preferably have all the series of sections shown in Figs. 4, 5 and 6 of the drawings, but it is to be understood that the explanatory sections may be dispensed with and if desired, the information contained thereon may be given to the audience by word of mouth.

I desire further to state that while I have shown alternate letters of the transposed title forming the words of the title, this is merely illustrative of my transposing method and illustrates the principle involved in one of its simple forms. This arrangement may be changed from week to week, as there may be two or three letters between each of the letters forming the successive words of the title, or a different number of letters between each word, but in all cases there will be employed only the exact letters and the exact number of letters used in the real title.

Although I have referred to displaying part two of the film one week after part one is displayed, it is apparent that any interval of time may lapse between the display of part one and part two, so long as an audience is given sufficient time to guess the title displayed at the end of part one of the film.

It is further to be understood that part two of the film, as shown in the drawings, will in reality become part one of a pair of film parts, when taken in connection with a film to follow it, and that the pictorial sections of part one of the film, shown in the drawings be displayed at the very beginning of the film, possibly preceded by a series of informing sections, as in that case there will be no reference necessary to the title of a preceding picture.

I desire it to be understood that all of the parts shown and described are not necessary to the carrying out of the principal features of my invention; but as displayed, they form a film which is self-explanatory and the object of which will be quite apparent to all viewing the projection on the screen made therefrom.

In its more detailed form, it is the intention to provide films that will be educational, and therefore under the principle of my invention, historical events or stories may be displayed, with a view of impressing the mind with the various occurrences and actions displayed by means of the pictorial sections, which will be retained and therefore be educating, due to the fact that it will be found necessary to remember the various incidents, occurrences or actions of the play in order to guess the title displayed in enigmatical form at the end of the pictorial sections. Where, therefore, historic or educational pictures are displayed, it will be especially valuable to younger people. In addition to the display of the picture and the enigmatical title thereof, programs may be disposed of to the audience having the enigmatical title of the play printed thereon to enable those who may wish to decipher the title at leisure, to do so and ascertain, at the display of the picture following, whether they have deciphered the title correctly. My invention is therefore both interesting and of educational value.

Having thus described my invention, what I claim is:—

1. A moving picture film comprising a series of pictorial sections, a series of sections following said pictorial sections and displaying the title of said pictorial sections in enigmatical form, and a series of sections following the sections having the title in enigmatical form explaining the manner of deciphering said title.

2. A moving picture comprising a series of pictorial sections, a series of sections following said pictorial sections and having the title of the latter displayed with the letters thereof transposed, and a series of informing sections preceding said pictorial sections bearing matter informing an audience that it is requested to guess the true title of said pictorial sections.

3. A moving picture film comprising a series of pictorial sections, a series of sections following the pictorial section and having the title thereof transposed and arranged to display the same on a screen in the act of being written, a series of informing sections preceding said pictorial sections bearing matter requesting an audience to guess the title as displayed on said second-mentioned series, and a series of explanatory sections advising the audience that the title as displayed will be deciphered at another time.

4. A moving picture film comprising two parts, one of said parts having a series of pictorial sections and a series of sections by means of which the title of said pictorial sections is displayed with the letters of the actual title transposed, the other part having a series of sections by means of which the transposed title of the first section is displayed, and a series of sections explaining the manner of reading said transposed title.

5. A moving picture film comprising two parts, one of said parts having a series of pictorial sections, a series of sections following said pictorial sections and having the title of the latter arranged thereon to display the same in transported form, the second part having a series of sections showing said title in transposed form, a series of sections following said last-mentioned series of sections and having said transposed title thereon and means to show the manner of deciphering said title to form the title in readable form, a series of pictorial sections following the deciphered sections, and a series of sections following the last-mentioned series of pictorial sections and having the title of said last-mentioned pictorial sections thereon to display the same in transposed form.

6. A moving picture film comprising two parts, each part having a series of pictorial sections and a series of sections following said pictorial sections and displaying the title of the pictorial section immediately preceding with its letters transposed, the second part of said film having a series of sections by means of which the transposed title of the first part is displayed and having a further series of sections preceding the pictorial sections thereon for displaying the manner of reading the transposed title of the first part.

7. A moving picture film comprising a series of sections having the title of a previously displayed film shown thereon in transposed form, a series of informing sections preceding said first-mentioned series of sections explaining that said transposed title was that of the picture previously displayed, a series of explanatory sections following the sections bearing the transposed title advising the audience that the transposed title will next be deciphered, a series of sections following said explanatory sections having the transposed title thereon and showing the manner of deciphering said title, a series of explanatory sections following said deciphered sections showing the title as deciphered in readable form, a series of informing sections following said series of sections which have the title in readable form advising the audience that a new picture will be next displayed, a series of pictorial sections following said last-mentioned informing sections, and a series of title sections following said pictorial sections and having the title of the latter displayed thereon with its letters transposed.

8. A moving picture film having a series of title sections showing the title of a previously displayed film with the letters of the title transposed and partly arranged upside down, a series of deciphering sections following said title sections showing said title in the manner displayed on said title sections and the manner of deciphering and reading part of said title, a second series of deciphering sections having said transposed title reversed thereon and showing the manner of deciphering and reading the remainder of said title, and a series of title sections following said second-mentioned deciphering sections and having the deciphered title thereon in readable form.

9. A moving picture film comprising two parts, one of said parts having a series of pictorial sections and a series of title sections by means of which the title of said pictorial sections is displayed in enigmatical form with the letters transposed and part arranged upside down, the other part of said film having a series of title sections with the enigmatical title of said first-mentioned part thereon, deciphering sections following said last-mentioned title sections and showing the transposed title or part thereof in the manner shown in said last-mentioned title sections and also on the remainder of said deciphering sections showing said transposed title upside down, said deciphering sections illustrating the manner of heading and transposed section, and a series of sections following said deciphering sections having the title as deciphered in readable form.

10. A moving picture film formed in two parts, each having a series of pictorial sections, a series of sections at the end of each of said series of pictorial sections having the title of the pictorial section immediately preceding in enigmatical form, and a series of sections between the title sections of the first part and the pictorial section of the second part illustrating the manner of deciphering the transposed title of the first part.

In testimony whereof I affix my signature.

HARRY KAHN.